United States Patent
Compain

(10) Patent No.: US 8,832,118 B1
(45) Date of Patent: Sep. 9, 2014

(54) SYSTEMS AND METHODS OF EVALUATING CONTENT IN A COMPUTER NETWORK ENVIRONMENT

(71) Applicant: Adam J. Spanky Compain, San Francisco, CA (US)

(72) Inventor: Adam J. Spanky Compain, San Francisco, CA (US)

(73) Assignee: Google Inc., Mountain View, CA (US)

( * ) Notice: Subject to any disclaimer, the term of this patent is extended or adjusted under 35 U.S.C. 154(b) by 87 days.

(21) Appl. No.: 13/648,967

(22) Filed: Oct. 10, 2012

(51) Int. Cl.
*G06F 17/30* (2006.01)

(52) U.S. Cl.
USPC .......................................... 707/748

(58) Field of Classification Search
CPC .................................................. G06F 17/3074
See application file for complete search history.

(56) References Cited

U.S. PATENT DOCUMENTS

| | | | |
|---|---|---|---|
| 2007/0022442 A1* | 1/2007 | Gil et al. | 725/62 |
| 2008/0005067 A1 | 1/2008 | Dumais et al. | |
| 2008/0109285 A1 | 5/2008 | Reuther et al. | |

FOREIGN PATENT DOCUMENTS

WO    WO-2012/103191 A2    8/2012

* cited by examiner

*Primary Examiner* — Hung Q Pham
(74) *Attorney, Agent, or Firm* — Foley and Lardner LLP; John D. Lanza

(57) ABSTRACT

Systems and methods of providing information via a computer network are provided. A data processing system can obtain, via the computer network, a request for content. The request for content can include a keyword. The data processing system can identify a content item responsive to the request for content based at least in part on the keyword, and can identify a match between a format of the content item and an input format of the request for content. The data processing system can assign a weighting factor to the content item based on the match, and responsive to the weighting factor can select the content item as a candidate for display at a computing device.

20 Claims, 3 Drawing Sheets

SYSTEMS AND METHODS OF EVALUATING CONTENT IN A COMPUTER NETWORK ENVIRONMENT

BACKGROUND

In a computer networked environment such as the internet, entities such as people or companies provide information for public display on documents such as web pages. The web pages can include information provided by the entities via a web page server for display on the internet. Third party content can also be provided by third parties for display on the web pages together with the information provided by the entities. Thus, a person viewing a web page can access the information that is the subject of the web page, as well as third party content that may or may not be related to the subject matter of the web page.

SUMMARY

At least one aspect is directed to a computer implemented method of providing information via a computer network. The method can obtain, by a data processing system via the computer network, a request for content. The request for content can include a keyword. The method can identify a content item responsive to the request for content based at least in part on the keyword, and can determine an input format of the request for content. The method can determine a format of the content item, and can identify a match between the format of the content item and the input format of the request for content. The method can assign a weighting factor to the content item based on the match, and responsive to the weighting factor can select the content item as a candidate for display at a computing device.

At least one aspect is directed to a system of providing information via a computer network. The system includes a data processing system can obtain, via the computer network, a request for content. The request for content can include a keyword. The data processing system can identify a content item responsive to the request for content based at least in part on the keyword, and can identify a match between a format of the content item and a format associated with the request for content. The data processing system can assign a weighting factor to the content item based on the match, and responsive to the weighting factor can select the content item as a candidate for display at a computing device.

At least one aspect is directed to a computer readable storage medium having instructions stored therein, the instructions being executable by one or more processors to cause the one or more processors to perform operations. The operations can include obtaining a request for content, wherein the request for content includes a keyword, and determining a format associated with the request for content. The operations can also include identifying a content item responsive to the request for content based at least in part on the keyword, and determining a format of the content item. The operations can include identifying a match between the format of the content item and the format associated with of the request for content, and assigning a weighting factor to the content item based on the match. The operations can also include selecting the content item as a candidate for display at the computing device responsive to the weighting factor.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
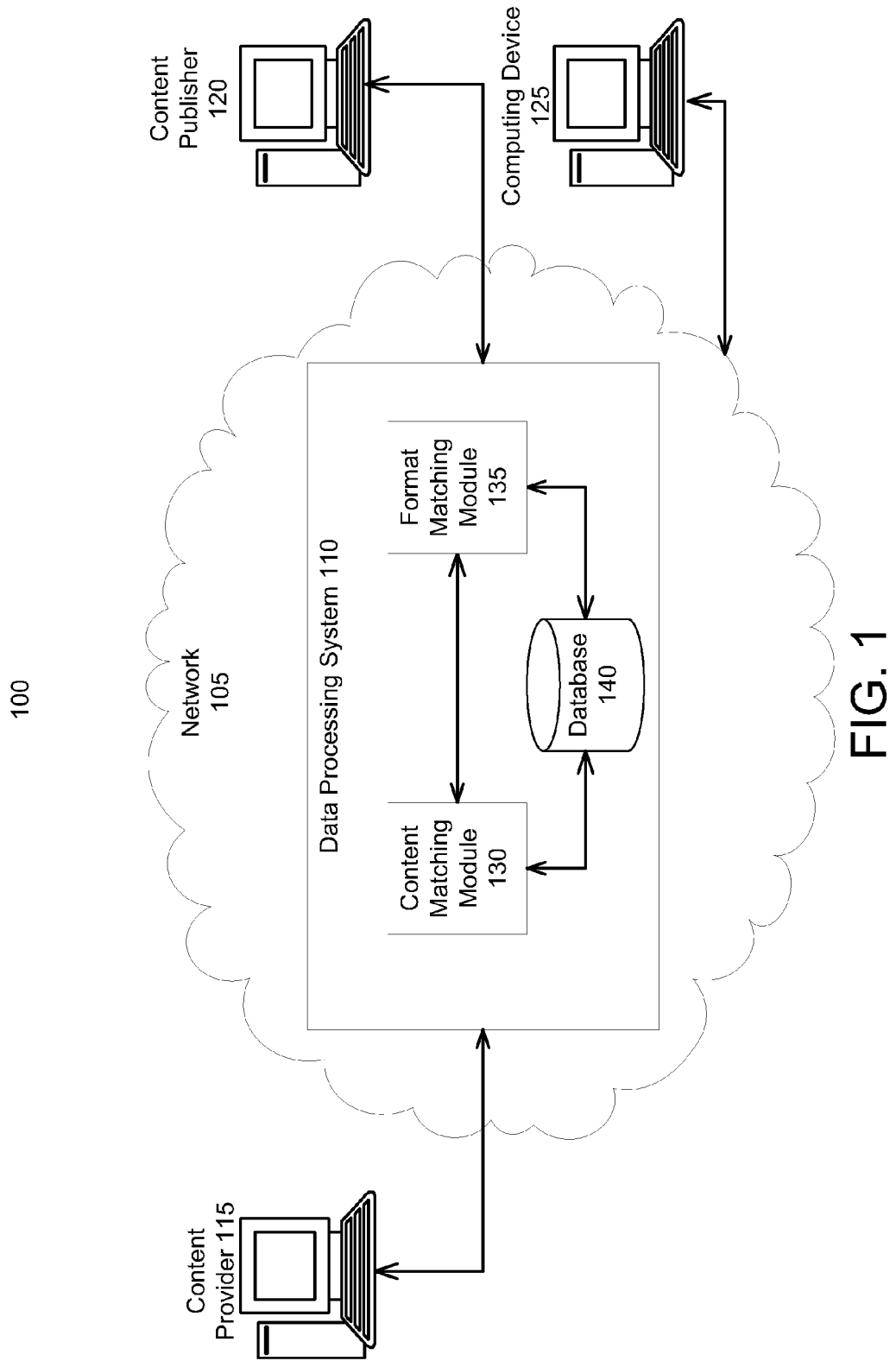
FIG. 1 is a block diagram depicting an example environment to provide information via a computer network, according to an illustrative implementation.

Following below are more detailed descriptions of various concepts related to, and implementations of, methods, apparatuses, and systems for providing information via a computer network. The various concepts introduced above and discussed in greater detail below may be implemented in any of numerous ways, as the described concepts are not limited to any particular manner of implementation. Examples of specific implementations and applications are provided primarily for illustrative purposes.

One implementation is directed toward identifying content items such as advertisements as candidates for display on an information resource such as a web page, website, domain name, online document, or application. For example, via a computer network such as the internet or other communication network, a data processing system can receive a request for content to display on a web page at a computing device. The data processing system can identify multiple content items (e.g., ads) responsive to the request. The content items can be in many different formats. For example, the content items identified responsive to the request can be in an audio format, video format, text format, image format, or combinations thereof.

The data processing system can identify the input format of the request for content. For example, the data processing system can determine that the request for content originated as a spoken command input into a smartphone computing device in an audio format. The data processing system can also determine the format of the multiple content items identified by the data processing system responsive to the request, and can identify content items whose format matches the format of the request for content. For example, the data processing system can identify audio ads or other content items having a format (e.g., audio or other preferred format) that matches the audio format of the request for content. The match can also be identified when the format of the content item and the input format of the request for content are different. For example, the data processing system can determine that a text format is the most suitable content item format for a request for content having an image input format.

In this example a match can be determined when the format of the content item matches the preferred format determined from the request for content.

The data processing system can assign a weighting factor to the content items having formats that match the format of the request for content. Responsive to the weighting factor, the data processing system can select content items for display at the computing device. For example, a content item having a weighting factor indicating that the content item and the request for content are at least partially in the same format can have a higher probability of being selected for display at the computing device where the request for content was made than a different content item, which may also be responsive to the request for content, but has a different format, such as a text format. The data processing system can provide the content items having matching formats, as well as other content items in different formats, as candidate content items for display at a computing device to a user. Some of the candidate content items can be selected for display, e.g., by an information resource such as an application executing at the computing device, based at least in part on the weighting factor.

Thus, in some implementations, the data processing system can determine the input format in which a request for content is entered into a computing device, and can use the input format as a factor to identify content items responsive to the request, in addition to the subject matter of the request for content. For example, content items sharing a format (e.g., audio, text, video) with the input format can be given preference for display at the computing device responsive to the request.

FIG. 1 illustrates an example system 100 for providing information via at least one computer network, such as the network 105. The network 105 can include computer networks such as the internet, local, wide, metro or other area networks, intranets, satellite networks, and other computer networks such as voice or data mobile phone communication networks. The system 100 can also include at least one data processing system 110. The data processing system 110 can include at least one logic device such as a computing device having a processor to communicate via the network 105, for example with at least one content provider 115, at least one content publisher 120, or at least one computing device 125.

The content provider 115 can include servers or other computing devices operated by a content provider entity to provide content for display on computing devices such as the computing device 125. The content provided by the content provider 115 can include third party content for display on information resources such as a web page that includes primary content, e.g. content provided by the content publisher 120. The web page can be a content web page or a search results web page. For example, the content provider 115 can provide ads or other content for display in content slots of content web pages such as a web page of a company where the primary content of the web page is provided by the company, or for display on a search results landing page provided by a search engine. The content provided by the content provider 115 can be displayed on information resources other than web pages, such as content displayed in an audio or other format as part of the execution of an application on a smartphone or other computing device 125.

The content publisher 120 can include servers or other computing devices operated by a content publishing entity to provide primary content for display via the network 105. For example, the content publisher 120 can include a web page operator who provides primary content for display on the web page. The primary content can include content other than that provided by the content provider 115, and the web page can include content slots configured for the display of third party content (e.g., ads) from the content provider 115. For example, the content publisher 120 can operate the website of a company and can provide content about that company for display on web pages of the website. The web pages can include content slots configured for the display of third party content items such as ads of the content provider 115. In some implementations, the content publisher 120 includes a search engine operator that operates a search engine website. The primary content of search engine web pages (e.g., a results or landing web page) can include results of a search query as well as third party content items displayed in content slots.

The computing device 125 can include computing devices configured to communicate via the network 105 to display data such as the content provided by the content publisher 120 (e.g., primary web page content) and the content provided by the content provider 115 (e.g., third party content items such as ads configured for display in a content slot of a web page). The computing device 125 can include desktop computers, laptop computers, tablet computers, smartphones, personal digital assistants, and other computing devices. The computing device 125 can include user interfaces such as microphones, speakers, touchscreens, keyboards, pointing devices, a computer mouse, touchpad, or other input or output interfaces.

The data processing system 110 can include at least one server. For example, the data processing system 110 can include a plurality of servers located in at least one data center or server farm. In one implementation, the data processing system 110 includes a content placement system. For example, the data processing system 110 can include at least one content matching module 130, at least one format matching module 135, and at least one database 140. The content matching module 130 and the format matching module 135 can each include at least one processing unit, server, circuit, engine, or other logic device such as programmable logic arrays configured to communicate with the database 135 and with other computing devices (e.g., the content provider 115, the content publisher 120, or the computing device 125) via the network 105. The content matching module 130 and the format matching module 135 can be separate components, a single component, or part of the data processing system 110.

The data processing system 110 can include the content matching module 130 and the format matching module 135 as part of one or more servers of a content placement system to identify content items as candidates for display at the computing device 125. For example, the content matching module 130 can be part of a server in a content placement system configured to match content requests with content items based on keywords or other criteria identified from the request for content. The format matching module 135 can be part of the same or a different server in the content placement system. The format matching module 135 can determine the format of the input request for information, and the format of content items that may be provided for display at the computing device 125 responsive to the request for information. In some implementations, the format matching module 135 determines whether or not the input format of the request for content matches the format of content items. For example, the format matching module 135 can identify a match between a request for content entered by audio (e.g., voice) into the computing device 125 and a content item having at least in part an audio display, such as an ad with a voiceover. In this example, the input format (e.g., audio) matches the format of the content item (e.g., audio).

In some implementations, the data processing system 110 obtains a request for content. For example, the data processing system 110 can receive a request for content items (e.g. advertisements) to provide for display with an information resource such as a web page or other document. The request for content can be received via the network 105 from the content publisher 120 or from the computing device 125. For example, the computing device 125 can communicate with the content publisher 120 via the network 105 to request access to an information resource (e.g., a web page) of the content publisher 120. Responsive to this request, the content publisher 120 (directly or via the computing device 125) can communicate with the data processing system 110 via the network 105 to request content for display with the information resource at the computing device 125.

The request for content can include at least one keyword, such as at least one word, identifier, phrase, index term, subject term, subject heading, tag, or descriptor that can be evaluated by the data processing system 110 for information retrieval purposes, e.g., to identify content items responsive to the request for content. The keyword associated with the request for content can include an audio keyword, a text keyword, an image keyword, a video keyword, or a mixed format keyword that includes at least one term or component in a different format than another term or component of the keyword. For example, from the request for content the data processing system 110 can identify at least one keyword that indicates at least one topic or subject of the request for content. The keyword associated with the request for content can be entered by the user into an interface of the computing device 125, for example as a text entered or voice entered search query. In some implementations, the data processing system 110 determines one or more keywords from the request for content. For example, the data processing system 110 may receive a request for content that includes a search query in any format (e.g., audio, text, or video) "please find a good Chinese restaurant". From this request for content, the data processing system 110 may identify the keyword "Chinese restaurant".

The request for content can include a request for content to display on an information resource at the computing device 125. The information resource can include a web page, website, domain name, online document, or application. For example, the request for content can be input into the computing device 125 (e.g., a smartphone) by a user during execution of an application by the computing device. In this example, the response to the request for content (e.g., the content item) can be displayed in any format at the computing device 125 during execution of the same or a different application.

In some implementations, the request for content indicates a preferred format for content items that are responsive to the request for content. For example, the content provider 115 (e.g., a merchant) of the content publisher (e.g., a website operator) can communicate with the data processing system 110 to implement an online ad campaign via the network 105. In this example, the content provider 115 can provide content items (or keywords used by the data processing system 110 to select content items) as potential candidates for display on web pages (or other information resources) at computing devices 125. In addition to providing keywords, the content provider 115 can indicate a preference to provide the content items for display on computing devices 125 responsive to identified input formats of requests for content, such as audio, video, text, or formats, or combinations thereof.

In some implementations, the content publisher 120 can communicate with the data processing system 110 to indicate a preference for an identified format of content items (e.g., content items of the content provider 115), such as at least partially text, text-only, audio, video, or combinations thereof. In this example, the data processing system 110 can prioritize (as indicated by the weighting factor) content items having a format indicated as preferred by the content publisher 120 for selection as candidate content items that may be displayed by the computing device 125. In one implementation, the data processing system 110 determines that the format indicated by the content publisher 120 as being a preferred format is the input format of the request for content, irrespective of the manner in which a user interfaces with the computing device 125 to request access to an information resource such as a web page of the content publisher 120.

The data processing system 110 can identify content items responsive to the request for content. For example, the content matching module 130 can evaluate the keyword associated with the request for content (e.g., "Chinese restaurant") and identify content items that satisfy the keyword, (e.g., content items suitable for display on an information resource at the computing device 124) such as advertisements for Chinese restaurants. The content items can include content provided by the content provider 115. The content items can be stored in the database 140 or in data storage units of the content provider 115. The content items can be retrieved from the database 140 or another database and provided via the network 105 to the content publisher 120 or the computing device 125 via the network 105 for display at the computing device 125. For example, the data processing system 110 can retrieve the content item from the database 140 and provide it for display at the computing device 125 (e.g., in an ad slot of a web page of the content publisher 120). The data processing system 110 can also instruct or authorize the content provider 115 to provide the content item for display at the computing device 125.

The request for content can be obtained by the data processing system 110 in multiple different formats. For example, the request for content can be entered into an interface of the computing device 125 in an audio format, a text format, a video format, an image format, a click to call format, a near field communications format, a wireless network format, wi-fi format, a radio communications format, a radio frequency identification format, or a mixed format that includes more than one format (e.g., audio and text), for example. The audio format can be a voice entry. For example, to request information a user of the computing device 125 can speak a request for content into a microphone of the computing device 125, can enter text into a keyboard or keyboard display of the computing device 125, or can upload or attach an image at a user interface of the computing device 125 as part of the request. The request for content can be communicated to the data processing system 110 via the network 105.

The data processing system 110 can determine an input format of the request for content. For example, the data processing system 110 can determine that the request for content was input to the computing device 125 in the audio, text, video, image, mixed, or other format. For example, the request for content obtained by the data processing system 110 can include a search query entered into the computing device 125. The search query (or other request for content) can include parameters or properties such as the format type of the request, the contextual inquiry of the request for content, and other data such as geographic location data or browser type data, for example. In some implementations, upon user input a signifier or identifier can be appended or assigned to the search query (e.g., to a search query packet). For example, a format type parameter can be appended to a search query packet of a request for content. The data processing system 110 can receive the request for content and evaluate the format type parameter to determine the format of the request for content. In one implementation, the content publisher 120 appends, assigns, or associates the format type parameter to or with the request for content.

The data processing system 110 can also determine the format of content items. For example, the data processing system 110 can identify the format of content items as being audio, video, text, image, or mixed formats. For example, the data processing system 110 can evaluate format type parameters associated with content items to determine the format of the content item. The format type parameters can be appended or assigned to content items, e.g., by the content provider 115, and stored in the database 140, for example. In some implementations, the data processing system 110 obtains an indication of the format of the content items from the content provider 115.

The data processing system 110 can determine a match between the format of the content items and the input format of the request for content. For example, the format matching module 135 can determine that the input format of the request for content and the format of at least one content item both include at least one common format such as an audio format. For example, the format matching module 135 can determine that the request for content is in an audio format and that a content item also includes an audio format. In this example, the formats of the request for content and the content items are the same, e.g., they are both audio formats. In some implementations, the format matching module 135 identifies the format of at least some of the content items that satisfy the request for content, e.g., that were identified by the data processing system 110 as being responsive to the request for content.

In some implementations, the data processing system 110 identifies a match when the formats of the request for content and the content items are different. For example, a user of the computing device 125 may wish to input a request for content using an image format. For example, the user can see a famous landmark but not know the name of that landmark. The user may take a picture of the landmark (e.g., with the computing device 125) and provide this image to the data processing system 110, where it can be received as part of a request for content about the landmark depicted in the image. In this example, the data processing system 110 can determine that the request for content has an image input format, and can determine a preferred format for content items responsive to the request for content based at least in part on the request for content or associated information. For example, the data processing system 110 can determine that an image format search query indicates a request for text information about an object depicted in the image.

The data processing system 110 (or component such as the format matching module 135) can determine that a text format (or any other format) is the preferred format for content items responsive to an image (or other) format request for content, based for example on the input format or other data of the request for content or data about the computing device 125. The data processing system 110 (or component such as the content matching module 130) can identify content items having the preferred format (e.g., a text format) that are responsive to the request for content (e.g., an image format), and these identified content items can be selected as candidates for display at the computing device 125 responsive to the request for content.

In various implementations, the identified match between the input format of the request for content and the format of content items can be based on the request for content and the content items having a same format, or having different formats where the format of the content items can be identified as a preferred format to respond to the request for content, based at least in part on the input format or other data associated with the request for content. In some implementations, the different formats are mutually exclusive, e.g., all preferred formats of the content items are different formats than all input formats of the request for content.

In some implementations, audio, text, image, or other formats include a click to call format where the content item includes text, video, image, or other data in a non-audio format such as a link, button, or other interface that the user can click on to initiate a telephone, VOIP (voice over internet protocol), or other network based communication session. The click to call format can include a mix of audio and text or other non-audio formats. The format matching module 135 can determine that the click to call format matches input formats of the request for content that include audio or the other non-audio formats. The data processing system 110 can provide the content item as a candidate item for audio display at the computing device 125 in the click to call format, responsive to a request for content having an audio input format. In this example, the data processing system 110 can identify the click to call format of the content item as the preferred format for a response to a request for content having an audio input format, and can identify a match between the click to call and audio formats that can be different formats that both include audio characteristics.

In one implementation, the content items identified by the data processing system 110 as having formats that match the input format of the request for content is a subset of the content items determined by the data processing system 110 to be responsive to the request for content. For example, the data processing system 110 can obtain a request for content having the keyword "Chinese restaurant" that was entered into the computing device 125 an audio format. Responsive to this request for content, the data processing system 110 can identify 10 (or any other number of) content items such as ads for Chinese restaurants that satisfy the request. The content items that satisfy the request for content can be in various formats. For example, eight of the ten content items for Chinese restaurants can be in text format, such as text based advertisements for Chinese restaurants, and two of the ten content items can include an audio format least in part. In this example, the format matching module 135 can identify a match between the input format of the request for content (e.g., audio) and the format of the two content items for Chinese restaurants that include at least some audio data. For example, the two matching content items can include an audio display of the name, address, hours, location, or cost of the Chinese restaurant. This audio format can be output from a speaker of the computing device 125 in an audio format responsive to the audio request for content as at least part of the display of the content item at the computing device 125.

The format matching module 135 can also determine that at least some of the content items responsive to the request for content are in formats that do not match the input format of the request for content. For example, with an audio (e.g., voice) input format of a request for content, the format matching module 135 can determine that eight of the ten content items that are responsive to the request for content remain responsive to the request for content but are content items configured for display at least in part in a non-matching format (e.g., text or other non-preferred format) when compared to the audio format request for content. In this example, the data processing system 110 determines that the eight content items are responsive to the request for content (e.g., they relate to Chinese restaurants) but they include at least in part a format (e.g., text) that is different than the audio input format in this example.

The data processing system 110 can assign a weighting factor to content items based on the match between the input format of the request for content and the format of the content items that are identified responsive to the request for content. The weighting factor can influence the likelihood that the content item associated with the weighting factor will be selected for display at the computing device 125, and selection of the content item can be responsive to (e.g. based at least in part on) the weighting factor. The weighting factor can be indicated on a scale, e.g., from 1 to 10, or can be a binary yes-no or zero-one weighting factor, or can be a positive/negative weighting factor where a positive weighting factor increases the probability that a content item will be provided for display at the computing device 125 and a negative weighting factor decreases the probability that a content item will be provided for display at the computing device 125. The weighting factor can be based on a points system. For example, the data processing system can assign a weight of 1 for video format, 2 for text format, and 3 for audio format, where the weighting factor of three indicates a greater likelihood that the associated content item will be selected as a candidate for display on the computing device than a weighting factor of one or two.

In some implementations, the data processing system 110 (or component thereof such as the content matching module 130) identifies a plurality of content items that responsive to the request for content. These content items generally satisfy the request for content. For example, the content matching module 130 can identify keywords from the request for content (e.g., "Chinese restaurant") and can identify a group of content items about Chinese restaurants such as ads for Chinese restaurants. In this example, the content matching module 130 identifies the group of content items responsive to the request for content based at least in part on the subject matter of the content items and the keywords of the request for content. The content matching module 130 can identify these content items that satisfy the request for content irrespective of the format of the content items and the format of the request for content. For example, the content matching module 130 can determine that a content item exclusively in a text, image, or video format, (or combinations thereof) that lacks data in an audio format is responsive to a request for content input into the computing device 125 in an audio format. The content matching module 130 can also determine that content items in this example that include at least some data in an audio format satisfy, or are responsive to, the request for content that has an audio input format.

Continuing with this example, the data processing system 110 (or component thereof such as the format matching module 135) can identify the format of at least some of the content items of the group of content items that are responsive to the request for content. For example, the format matching module 135 can determine the formats associated with the display of each content item that satisfies the request for content. These formats may include audio, text, video, image, or mixed formats (e.g., combinations thereof). For example a content item may include a text display with an audio display that runs concurrently with the text display on the computing device 125.

The format matching module 135 can determine that the format of a content item matches the input format of the request for content. The match between these formats can include a partial match. For example, an audio input format can match a content item having data displayed in audio, text, and video formats. The request for content can also include multiple formats, such as text and image formats. The format matching module 135 can identify a match between an input format of the request for content and the format of the content item when the request for content and the content item share at least one data format, such as any audio format (e.g., voice), any video format, or any text format.

In one implementation, the match is an exclusive match between the input format of the request for content and the format of the content item. For example, a user can speak a request for content into the computing device 125. The data processing system 220 can obtain the request for content and identify the input format as an audio format. In this example, the format matching module 135 can identify a match between the input format and content items responsive to the request that exclusively have an audio format and no additional formats.

The data processing system 110 can assign a weighting factor to the content items based on the type of match between the input format of the request for content and the format of the content item. For example, a content item having data in a format that is of the same general category as the input format of the request for content (e.g., the same or different audio formats) but that also includes additional formats (e.g., image or text) can be given a different weighting factor (e.g., higher or lower) than a content item exclusively having the same format as the input format of the request for content.

In some implementations, the data processing system 110 can select the content items responsive to the request for content as candidates for display at the computing device 125. The selected candidate content items generally include subject matter similar to subject matter of the request for content (as indicated for example by keywords of the request for content). The selected candidate content items can include content items to which the weighting factor has been assigned as well as content items that are not associated with this type of weighting factor. The number of candidate content items can be greater than the number of content items that are displayed at the computing device 125. For example, the data processing system 110 can identify tens, hundreds, or thousands of content items that are responsive to the request for content. From this number of candidate content items, one, two, or a few content items may be provided for display at the computing device 125. For example, the computing device 125 may display a web page having space (e.g., content slots) for three content items per rendering. In this example, three content items can be selected from the group of candidate content items for display with a rendering of the web page at the computing device 125.

The weighting factor can influence the likelihood that a candidate content item from the group of candidate content items are selected for display at the computing device 125, and a candidate content item can be selected responsive to or based at least in part on the weighting factor. For example, a user providing audio input into the computing device 125, such as an audio request for content, may prefer a response to the request that includes audio output. The weighting factor indicating at least a partial format match can be used when determining which candidate content items to select or provide for display at the computing device 125. In this example, the weighting factor can increase the probability that the audio format candidate content item be selected for display responsive to a request for content having an audio input format. The data processing system 110 can select the content item as the candidate content item based on other factors in addition to the at least partial match between the content formats, such keywords of the request for content, (e.g., terms of a search query), other information associated with the request for content, or the subject matter of the content items.

In some implementations, the data processing system 110 (or another component of a content placement system such as a bid server) can select at least one content item from the group of candidate content items for display at the computing device 125, responsive to the request for content. The weighting factor assigned to content items of the group of candidate content items can be one of multiple factors considered in this selection. For example, candidate content items can be selected for display at the computing device 125 based on at least one or the weighting factor, the keywords of the request for content, the subject matter of the content items, the size, content, or dimensions of the content item, parameters set forth by the content publisher 120, parameters or limitations of the computing device 125, or a bid price that the content provider 115 agrees to pay for display of a content item.

In some implementations, the data processing system 110 determines the formats of the content items that are responsive to the request for content, and ranks the content items based at least in part on the formats of the content items and the input formats of the request for content. For example, the data processing system 110 can use the weighting factor to rank the content items in an order from most to least suited for display on the computing device 125 responsive to the request for content, (e.g., in a numerical order, or grouped into tiers or categories).

In some implementations, the data processing system 110 identifies formats that are absent from the request from content, or from the content items. For example, the data processing system 110 can obtain a request for content having a non-text input format, (such as an exclusive audio format). Continuing with this example, the data processing system 110 can determine that a content item is configured for display at least in part in a non-text format (such as an exclusive audio, or audio and image mixed format). In this example, the format matching module 135 can determine a format match between the input format (e.g., they both include date for display in a non-text format) and can identify the content item as a candidate content item for display at the computing device 125 based at least in part on the matching non-text formats.

The weighting factor, or lack of a weighting factor, can influence whether or not the data processing system 110 selects content items as candidate content items that may be provided for display at the computing device 125. For example, the data processing system 110 (or component thereof such as the format matching module 135) can identify a mismatch between the format of the content item (e.g., text) and the input format of the request for content (e.g., audio). The data processing system can assign a weighting factor to the content item having the mismatched format. This weighting factor can decrease the likelihood that the associated content item is selected as a candidate content item or provided for display at the computing device 125. In one implementation, based on the mismatch the data processing system 110 disqualifies the content item having the format mismatch with respect to the input format of the request for content as a candidate for display at a computing device such as the computing device 125.

Figure 2:
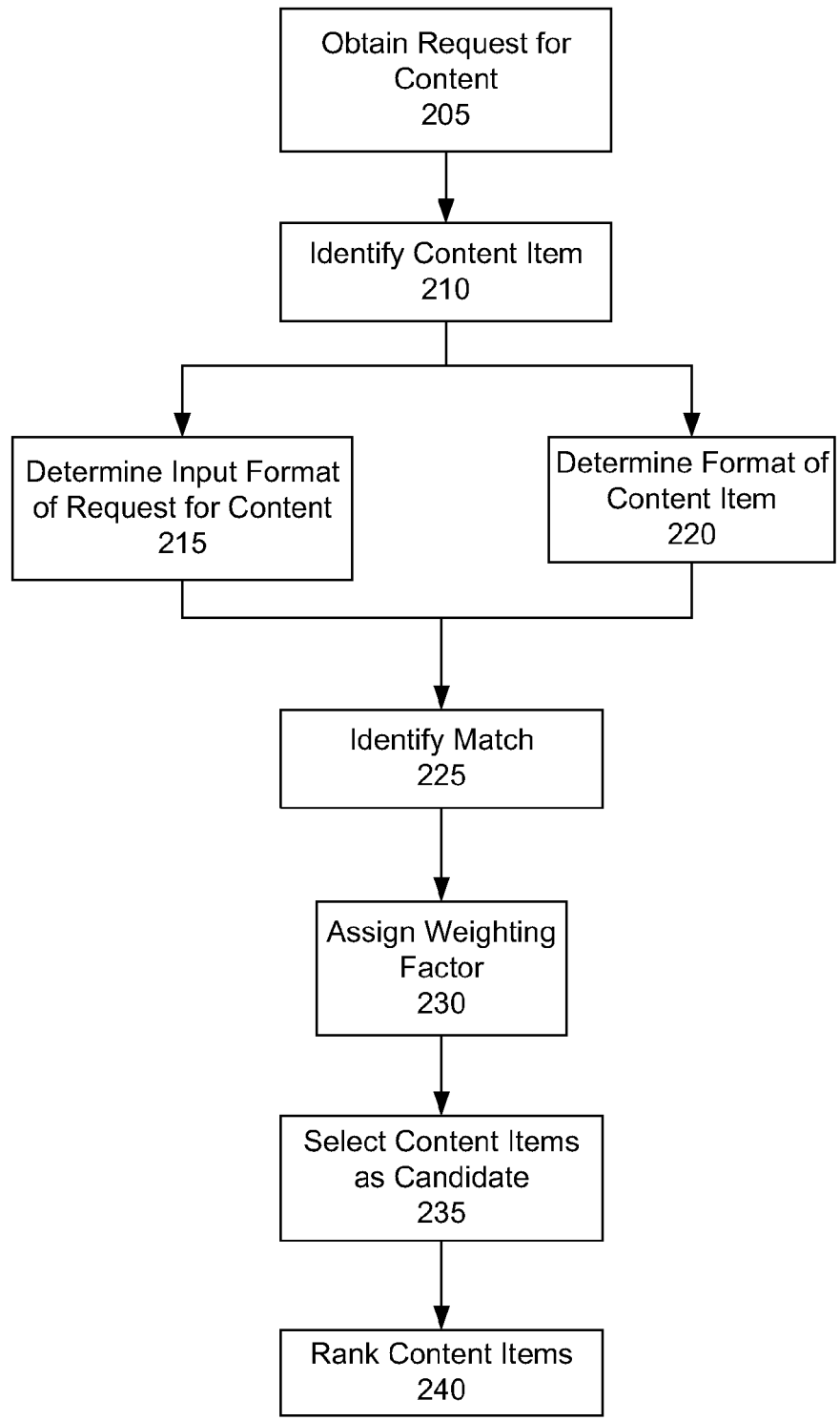
FIG. 2 is a flow diagram depicting a method of providing information via a computer network, according to an illustrative implementation.

FIG. 2 illustrates a flow diagram depicting a method 200 of providing information via a computer network. The method 200 can include an act of obtaining a request for content (BLOCK 205). For example, a data processing system can receive a request for content from a computing device via a network such as the internet or a mobile computing device network such as a cell phone voice or data network. The obtained request for content (BLOCK 205) can include at least one keyword, for example as a term of a search query. The data processing system can obtain the request for content (BLOCK 205) that was input into a computing device in various formats. For example, the request for content can be entered by audio or voice communication with a computing device, manually (e.g., a text entry into a user interface of the computing device), or visually (e.g., a video or image data entry or upload into a user interface of the computing device).

The method 200 can include an act of identifying at least one content item responsive to the request for content (BLOCK 210). For example, the data processing system or a component thereof such as a content matching module (e.g., at least one logic device) can identify, derive, or determine at least one keyword from the obtained request for content. Based on the keyword, the data processing system can identify one or more content items such as ads having subject matter similar to, the same as, or related to the subject matter indicated by the keyword (BLOCK 210).

The method 200 can include an act of determining an input format of the request for content (BLOCK 215) and acts of determining a format of the content item (BLOCK 220). For example, the data processing system can determine that the request for content has an audio, video, text, mixed, or other type of input format (BLOCK 215) based on the data obtained (BLOCK 205) with the request for content. The input format generally indicates how the request for content was entered into a computing device, or indicates a preferred format of a content publisher. The data processing system can also determine the format of the content items (BLOCK 220) as being audio, video, text, mixed, or other types of formats, based for example on data obtained from at least one content provider.

The method 200 can include an act of identifying a match between at least one format of the content items and at least one input format of the request for content (BLOCK 225). For example, the data processing system or a component thereof such as the format matching module (e.g., at least one logic device) can determine that the input format of the request for content and the format of at least one content item both include at least one audio format and therefore the formats match in this example. The data processing system can determine matches between input formats of requests for content and formats of content items (BLOCK 225) based on complete matches. For example, the general formats (e.g., audio, video, text, or click to call formats) can be the same for both, e.g., both the input format of the request for content and the format of a content item are exclusively audio, or exclusively text, or exclusively another format type.

In some implementations, the data processing system determines matches between input formats of requests for content and formats of content items (BLOCK 225) based on at least partial matches. For example, both the input format of the request for content and the format of a content item include at least one common general format (e.g., audio, video, text, or click to call). In this example, the input format or the format of the content item may include additional formats. For example, the input format of the request for content may be a text format, and the format of the content item may include a text format and also include an audio, video, or other at least partially non-text format such as a click to call format that can include both text and non-text formats.

The method 200 can include an act of assigning at least one weighting factor to the content item (BLOCK 230). The weighting factor can influence the probability that the associated content item will be selected for display at a computing device, such as the computing device from which the request for content originated. For example, based on the identified match (BLOCK 225), the data processing system can associate a content item with a weighting factor that indicates at least one common format between the input format of the request for content and the format of the content item (BLOCK 230). The weighting factor in this example can increase the likelihood of the associated content item (to which the weighting factor has been assigned) being selected for display at a computing device, for example responsive to the request for content.

The weighting factor can decrease the likelihood of selection of the associated content item. For example, the data processing system can assign a weighting factor to a content item that indicates the lack or absence of a match between formats of the content item and formats of the input request for content (BLOCK 230). In this example, the formats of the request for content and of the content item associated with the weighting factor can be mutually exclusive, such as an audio input format of the request for content and a text format of a content item. In this example, the data processing system can determine that the content item is responsive to the request for content (BLOCK 210) for example based on subject matter similarities between keywords of the request for content and the subject matter of the content items. However, due to the identified mismatch between formats, the data processing system can assign a weighting factor (BLOCK 230) that disqualifies or reduces the probability that the content item will be provided for display at the computing device responsive to the request for content.

The method 200 can include an act of selecting the content item as a candidate for display at one or more computing devices (BLOCK 235). For example, the data processing system can select all or some of the identified content items (BLOCK 210) as candidates for display (BLOCK 235) at a computing device from which the request for content originated. In some implementations the data processing system exclusively selects as candidates (BLOCK 235) the content items having weighting factors that indicate at least a partial match between at least one format of the content items and at least one input format of the request for content. In one implementation, the data processing system selects as candidates (BLOCK 235) content items having a positive weighting factor that indicates at least a partial match between at least one format of the content items and at least one input format of the request for content, as well as content items that lack the weighting factor or that include a negative weighting factor that influences the absence of a match (or a mismatch) between formats.

The method 200 can include an act of ranking the content items (BLOCK 240). For example, based on the weighting factor assigned (BLOCK 230) to the content items, the data processing system can rank or order the content items into a hierarchy (BLOCK 240) that indicates the probability of the content items being provided for display at the computing device. The ranking can include an individual ranking of content items, or a grouping or categorizing of content items into tiers or groups that do not include individual rankings of content items.

Figure 3:
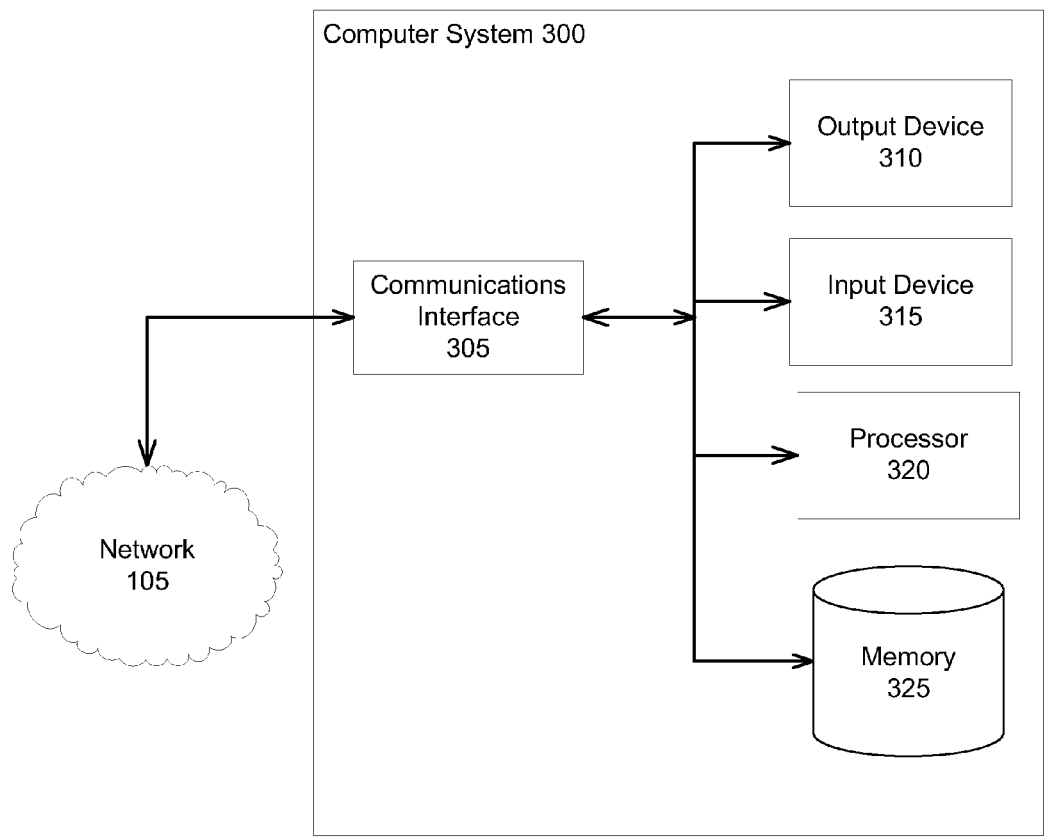
FIG. 3 is a block diagram illustrating a general architecture for a computer system that may be employed to implement various elements of the systems and methods described and illustrated herein, according to an illustrative implementation.

FIG. 3 shows the general architecture of an illustrative computer system 300 that may be employed to implement any of the computer systems discussed herein (including the system 100 and its components such as the data processing system 110, the content matching module 130, or the format matching module 135 of FIG. 1) in accordance with some implementations. The computer system 300 can be used to provide information via the network 105, for example to select content items for display on the computing device 125 based at least in part on the format of the content items and the format of a request for content to display at the computing device 125. The computer system 300 of FIG. 3 comprises one or more processors 320 communicatively coupled to memory 325, one or more communications interfaces 305, and one or more output devices 310 (e.g., one or more display units) and one or more input devices 315. The processors 320 can be included in the data processing system 110 or the other components of the system 100 such as the content matching module 130 or the format matching module.

In the computer system 300 of FIG. 3, the memory 325 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the content matching module 130, the format matching module 135, or the database 140 can include the memory 325 to store content items, information indicating the format of the content items, requests for content, or information indicating the input format of requests for content. The processor(s) 320 shown in FIG. 3 may be used to execute instructions stored in the memory 325 and, in so doing, also may read from or write to the memory various information processed and or generated pursuant to execution of the instructions.

The processor 320 of the computer system 300 shown in FIG. 3 also may be communicatively coupled to or control the communications interface(s) 305 to transmit or receive various information pursuant to execution of instructions. For example, the communications interface(s) 305 may be coupled to a wired or wireless network, bus, or other communication means and may therefore allow the computer system 300 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 300. Examples of communications interfaces 305 include user interfaces.

The output devices 310 of the computer system 300 shown in FIG. 3 may be provided, for example, to allow information to be viewed or perceived in connection with execution of the instructions. The input device(s) 315 may be provided, for example, to allow a user to make manual adjustments, make selections, enter data or other information, or interact in any of a variety of manners with the processor during execution of the instructions. Additional information relating to a general computer system architecture that may be employed for various systems discussed herein is provided at the conclusion of this disclosure.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from a content server of other data processing system that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the content server.

The terms "data processing apparatus" "data processing system" "module" "engine" or "computing device" encompass apparatus, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content matching module 130 and the format matching module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing systems such as system 300 or system 100 can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

The implementation details described herein should not be construed as limitations on the scope of what may be claimed, but rather as descriptions of features specific to particular implementations of the systems and methods described herein. Certain features that are described in this specification in the context of separate implementations can also be implemented in combination in a single embodiment or implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content matching module 130 and the format matching module 135 can be a single module, a logic device having one or more processing circuits, part of a search engine, or part of a content placement system such as an ad server.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, matches between formats can be based on matches between generic format categories (e.g., audio, video, text or other format categories), or can be based on more specific format matches, (e.g., a particular audio file format such as an uncompressed audio format stored in a .wav file). Input formats of the request for content and formats of the content items can be determined to match when they are the same formats, or when they are different formats. For example, the data processing system can determine that an audio input format of a request for content and a content item having an audio format are a match. The data processing system can also determine that, for example, an image input format and a text content item format are a match. For example, based at least in part on the image input format, the data processing system can determine that a text format of a content item is a preferred format, and can identify a match between the (e.g., image) input format and the content item having the preferred content item format (e.g., text). The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer implemented method of providing information via a computer network, comprising:
    obtaining, by a data processing system via the computer network, a request for content, wherein the request for content includes a keyword;
    identifying a first content item and a second content item responsive to the request for content based at least in part on the keyword;
    determining an input format of the request for content;
    determining a first format of the first content item and a second format of the second content item, the second format different than the first format;
    identifying a match between the first format of the first content item and the input format of the request for content;
    identifying a mismatch between the second format and the input format of the request for content;
    assigning a first weighting factor to the first content item based, at least in part, on the match between the first input format and the input format of the request for content;
    assigning a second weighting factor to the second content item based, at least in part, on the mismatch between the second format and the input format of the request for content; and
    selecting the first content item for presentation at a computing device based, at least in part, on the first weighting factor.

2. The method of claim 1, wherein the first content item has a greater probability of selection for presentation with an information resource at the computing device responsive to the request for content than the second content item based, at least in part on the first weighting factor.

3. The method of claim 1, wherein identifying the first content item and the second content item is part of identifying a plurality of content items including the first content item and the second content item as candidates for presentation with an information resource, wherein determining the first format of the first content item and the second format of the second content item is part of determining formats of each of the plurality of content items the method further comprising:
    ranking the plurality of content items for presentation with the information resource based, at least in part, on the formats of each of the plurality of content items, wherein the information resource includes at least one of a web page, a website, a domain name, an online document, and an application.

4. The method of claim 1 further comprising:
    determining that the input format of the request for content and the first format of the first content item both include audio formats; and
    selecting the first content item for presentation at the computing device based, at least in part, on the input format of the request for content and the first format of the first content item both including the audio formats.

5. The method of claim 1, wherein the input format of the request for content is a non-text format, the method further comprising:
    determining that the first content item is configured for presentation at least in part in the non-text format; and
    selecting the first content item for presentation at the computing device responsive to the request based, at least in part, on the first content item being configured for presentation at least in part in the non-text format.

6. The method of claim 1 further comprising:
    disqualifying the second content item as a candidate for presentation at the computing device based on the mismatch between the second format of the second content item and the input format of the request for content.

7. The method of claim 1 wherein the first content item is selected for presentation with a web page, wherein the web page is at least one of a search results web page and a content web page.

8. The method of claim 1 further comprising:
    determining that the input format of the request for content includes an audio format;
    determining that the first format of the first content item includes at least one of an audio format and a click to call format; and
    identifying the match between the first format of the first content item and the input format of the request for content based on at least one of the audio format and the click to call format.

9. The method of claim 1, wherein the input format of the request for content includes an audio format, the method further comprising:
    selecting the first content item for audio presentation at the computing device in a click to call format.

10. The method of claim 1, wherein the request for content includes a request for content to present with a web page, wherein the first content item is selected for presentation with the web page based on the request for content and the first weighting factor.

11. The method of claim 1, wherein the first format of the first content item includes at least one of an audio format, a visual format, an image format, a text format, a video format, a click to call format, a near field communication format, or a mixed format, and wherein the keyword includes at least one of an audio keyword, a text keyword, an image keyword, a video keyword, or a mixed format keyword.

12. The method of claim 1, further comprising:
determining a preferred format based, at least in part, on the request for content;
determining that the first format of the first content item includes the preferred format; and
identifying a match between the first format of the first content item and the preferred format, wherein the first format of the first content item and the preferred format are different formats.

13. A system comprising:
one or more processors; and one or more storage devices storing instructions that, when executed by the one or more processors, cause the one or more processors to perform operations comprising:
obtaining, via a computer network, a request for content, wherein the request for content includes a keyword;
identifying a first content item and a second content item responsive to the request for content based, at least in part, on the keyword;
identifying a match between a first format of the first content item and a format associated with the request for content;
identifying a mismatch between a second format of the second content item and the format associated with the request for content;
assigning a first weighting factor to the first content item based, at least in part, on the match between the first input format and the format associated with the request for content;
assigning a second weighting factor to the second content item based, at least in part, on the mismatch between the second format and the format associated with the request for content; and
selecting the first content item or the second content item as a candidate for presentation at a computing device based, at least in part, on the first weighting factor or the second weighting factor.

14. The system of claim 13, wherein the first weighting factor increases a probability of providing the first content item for presentation on an information resource of the computing device responsive to the request for content relative to a probability of providing the second content item.

15. The system of claim 13 wherein the one or more storage devices store instructions that cause the one or more processors to perform further operations comprising:
identifying the format associated with the request for content as one of an input format of the request for content or a preferred format determined from the request for content; and
identifying the match between the first format of the first content item and one of the input format of the request for content or the preferred format determined from the request for content.

16. The system of claim 13, wherein the first content item has a greater probability of selection for presentation with an information resource at the computing device responsive to the request for content than the second content item based, at least in part on the first weighting factor and the second weighting factor.

17. The system of claim 13, wherein the first format of the first content item includes at least one of an audio format, a visual format, an image format, a text format, a video format, a click to call format, a near field communication format, or a mixed format.

18. A computer readable storage medium having instructions stored therein, the instructions being executable by one or more processors to cause the one or more processors to perform operations comprising:
obtaining a request for content, wherein the request for content includes a keyword;
determining a format associated with the request for content;
identifying a first content item and a second content item responsive to the request for content based, at least in part, on the keyword;
determining a first format of the first content item and a second format of the second content item, wherein the second format is different than the first format;
identifying a match between the first format of the first content item and the format associated with the request for content;
identifying a mismatch between the second format of the second content item and the format associated with the content item;
assigning a first weighting factor to the first content item based, at least in part, on the match between the first input format and the input format associated with the request for content;
assigning a second weighting factor to the second content item based, at least in part, on the mismatch between the second format and the input format associated with the content item; and
selecting the first content item or the second content item as a candidate for presentation at the computing device based, at least in part, on the first weighting factor or the second weighting factor.

19. The computer readable storage medium of claim 18, wherein the first content item has a greater probability of selection for presentation with an information resource at the computing device responsive to the request for content than the second content item based, at least in part on the first weighting factor and the second weighting factor.

20. The computer readable storage medium of claim 18, wherein the first format of the first content item includes at least one of an audio format, a visual format, an image format, a text format, a video format, a click to call format, a near field communication format, or a mixed format, and wherein the second format of the second content item includes at least one of an audio format, a visual format, an image format, a text format, a video format, a click to call format, a near field communication format, or a mixed format.

* * * * *